United States Patent [19]

Meyer et al.

[11] Patent Number: 5,474,793
[45] Date of Patent: Dec. 12, 1995

[54] PROCESS FOR PREPARING CALCIUM-SUPPLEMENTED NOT-FROM-CONCENTRATE FRUIT JUICE BEVERAGES

[76] Inventors: Larry E. Meyer; Russell A. Parker, both of The Proctor & Gamble Company, 6071 Center Hill Ave.-F3A12, Cincinnati, Ohio 45224-1703

[21] Appl. No.: 240,542

[22] Filed: May 10, 1994

[51] Int. Cl.$^6$ .................................................. A23L 2/02
[52] U.S. Cl. .................. 426/599; 426/74; 426/330.5; 426/519
[58] Field of Search .................. 426/599, 74, 330.5, 426/333, 519

[56] References Cited

U.S. PATENT DOCUMENTS

| | | | |
|---|---|---|---|
| 2,325,360 | 7/1943 | Ayers et al. | 99/155 |
| 3,657,424 | 4/1972 | Aktins et al. | 424/153 |
| 3,949,098 | 4/1976 | Bangert | 426/324 |
| 4,002,324 | 1/1977 | Huet | 259/9 |
| 4,089,050 | 5/1978 | Huet | 366/181 |
| 4,382,823 | 5/1983 | Gudnason | 127/57 |
| 4,453,901 | 6/1984 | Zimmerly | 418/206 |
| 4,478,645 | 10/1984 | Gundmason | 127/157 |
| 4,676,988 | 6/1987 | Efstathiou et al. | 426/271 |
| 4,722,847 | 2/1988 | Heckert | 426/74 |
| 4,737,375 | 4/1988 | Nakel et al. | 426/590 |
| 4,738,856 | 4/1988 | Clark | 426/74 |
| 4,786,510 | 11/1988 | Nakel et al. | 426/74 |
| 4,830,862 | 5/1989 | Braun et al. | 426/74 |
| 4,851,221 | 7/1989 | Pak et al. | 424/693 |
| 4,871,554 | 10/1989 | Kalala et al. | 426/74 |
| 4,872,919 | 10/1989 | Bucher et al. | 134/3 |
| 4,919,963 | 4/1990 | Heckert | 426/599 |
| 4,946,702 | 8/1990 | Stipp et al. | 426/599 |
| 4,992,282 | 2/1991 | Mehansho et al. | 426/72 |
| 4,994,283 | 2/1991 | Mehansho et al. | 426/74 |
| 5,006,354 | 4/1991 | Rahrooh et al. | 426/231 |
| 5,073,397 | 12/1991 | Tarr et al. | 426/599 |
| 5,225,221 | 7/1993 | Camden et al. | 426/74 |
| 5,232,726 | 8/1993 | Clark et al. | 426/519 |

FOREIGN PATENT DOCUMENTS

| | | | |
|---|---|---|---|
| 0323667A2 | 7/1989 | European Pat. Off. | A23L 2/26 |
| 0350523A1 | 1/1990 | European Pat. Off. | A23L 2/06 |
| 2207335 | 7/1987 | United Kingdom | A23L 2/00 |

OTHER PUBLICATIONS

U.S. Ser. No. filed on Sep. 16, 1993 by Zuniga et al.
U.S. Ser. No. 08/122,733 filed on Sep. 16, 1993 by Burkes et al.
U.S. Ser. No. 08/138,938 filed on Oct. 19, 1993 by Burkes et al.

*Primary Examiner*—Helen Pratt
*Attorney, Agent, or Firm*—Eric W. Guttag; Rose Ann Dabek; J. C. Rasser

[57] ABSTRACT

A process for preparing calcium-supplemented, ready-to-serve, not-from-concentrate (NFC) fruit juice beverages is disclosed. This process involves circulating an acidified NFC juice stream containing citric and malic acid from a blend tank through a mixing zone that creates turbulent flow. A powdered source of calcium is then added to this acidified juice stream in the mixing zone. The calcium supplemented juice is recirculated back to the blend tank until the acidified juice comprises from about 0.05 to about 0.26% by weight solubilized calcium.

10 Claims, No Drawings

PROCESS FOR PREPARING CALCIUM-SUPPLEMENTED NOT-FROM-CONCENTRATE FRUIT JUICE BEVERAGES

TECHNICAL FIELD

This application relates to fruit juice beverages which are nutritionally supplemented with significant levels of calcium. This application particularly relates to a process for preparing these calcium-supplemented beverages with not-from-concentrate juice, i.e., a fleshly squeezed or extracted juice which may or may not be pasteurized.

BACKGROUND OF INVENTION

Dietary calcium inadequacy may be a contributing cause to osteoporosis, at least for some populations. For example, a positive correlation between calcium intake and bone mass has been found across many age groups. It has also been suggested that the level of calcium intake early in life directly influences the peak bone mass achieved at skeletal maturity.

During the period of late teenage to young adulthood, it has been found that a significant reduction in dietary calcium intake typically occurs. This is especially true of the female population where reduced dietary calcium intake usually happens much earlier in life compared to their male counterparts. Accordingly, females, as a class, are especially susceptible to a prolonged calcium deficit over their life span. This calcium deficit may be one reason for the greater incidence of osteoporosis in post menopausal women.

Calcium can be obtained from a variety of dietary sources. The primary sources of calcium are dairy products, in particular, milk. Milk provides a very valuable source of dietary calcium. However, beginning in late teenage to young adulthood and continuing through later life, milk is typically not consumed in sufficient quantities by the general population to obtain needed levels of calcium. This may be caused by the unattractiveness of milk as a drink for "social occasions". Indeed, it has been found that teenage girls, and especially young adult women, generally find milk to be a socially unattractive drink, as well as too caloric and unappealing in taste. Also, a significant portion of the population becomes lactose intolerant as they reach maturity, resulting in gastrointestinal problems if they consume milk.

To achieve greater consumption of calcium, a more appealing alternative to milk is apparently needed. This alternative must be one which is consumed in sufficient quantities to provide nutritionally beneficial amounts of calcium. Fruit juice beverages are consumed often by the general public at breakfast, especially orange juice. Like milk, orange juice has a wholesome, nutritional image. Also, orange juice is generally considered to have an appealing taste. Accordingly, orange juice nutritionally supplemented with calcium could be viewed as an additional vehicle for achieving greater dietary calcium intake throughout life.

Nutritional supplementation of orange juice, or other fruit juices, with significant levels of calcium is not straight forward. Milk contains, on average, about 0.12% calcium by weight. Inclusion of such a high level of calcium in orange juice requires consideration of a number of issues.

One potential issue is insuring that the calcium, once solubilized, does not precipitate out of the juice. Precipitation of calcium from juice concentrates can be a very significant problem because of the high level of calcium and low water levels present. However, precipitation of calcium from ready-to-serve single-strength juice products can also occur due to the acid systems and other components present in the juice. Orange juice naturally contains a mixture of citric acid and malic acid. The most thermodynamically stable calcium citrate species which forms when a calcium source is added directly to orange juice are also the most insoluble. These insoluble calcium titrate species can precipitate out of the orange juice fairly rapidly.

Ready-to-serve calcium-supplemented chilled juice product have been prepared previously by various methods. One of these methods is referred to as the "premix" method. See U.S. Pat. No. 4,919,963 (Heckert), issued Apr. 24, 1990 and U.S. Pat. No. 4,722,847 (Heckert), issued Feb. 2, 1988. In this method, a meta-stable aqueous premix solution of solubilized calcium is formed with a mixture of citric and malic acid which is then added to reconstituted fruit juice made from a concentrate. The meta-stable aqueous premix solution uses calcium carbonate, calcium oxide, or calcium hydroxide as the calcium source. This solubilized calcium is then added to the fruit juice, plus other fruit juice materials such as fruit juice aroma and flavor volatiles, peel oil, and pulp (or pomace) to provide a ready-to-serve drinkable chilled juice product.

Even using the "premix" method taught in the Heckert patents, ready-to-serve, calcium-supplemented chilled juice products present special calcium precipitation problems. To prolong stability against microbial and mold growth, chilled juice products are pasteurized or sterilized prior to being packed. This typically involves passage of the juice stream through high temperature (typically from about 180° F. (82.2° C.)) to about 212° F. (100° C.)) or ultra-high temperature (typically from about 212° F. (100° C.) to about 260° F. (126.7° C.)) pasteurization or sterilization equipment. Examples of such equipment are plate and frame heat exchangers (high temperature) and direct steam infusion sterilizers (ultra-high temperature).

As calcium-containing fruit juice streams pass through high temperature pasteurization or sterilization equipment, calcium salts present in the juice stream can precipitate out. This is particularly true of calcium-containing citrus juice streams involving calcium hydroxide or calcium carbonate. When these juice streams pass through high temperature pasteurization or sterilization equipment, insoluble calcium titrate can precipitate out which can then deposit on the internal surface of the pasteurizer or sterilizer. Without periodic shutdown and cleaning of the equipment, this precipitated calcium titrate eventually flakes off into the finished chilled juice product stream. In the case of plate and frame heat exchangers, the precipitated and deposited calcium titrate can reduce heat transfer efficiency.

To solve the calcium precipitation problem caused by passage of fruit juice streams through high temperature pasteurization or sterilization equipment, a method called "post-addition" was developed for preparing these ready-to-serve chilled products. See U.S. Pat. No. 5,225,221 to Camden et al. issued Jul. 6, 1993. In this "post-addition" method, an aqueous slurry typically containing about 10% calcium hydroxide is prepared. This calcium hydroxide slurry is then homogeneously dispersed in the pasteurized or sterilized juice stream to provide a calcium-supplemented ready-to-serve, chilled product.

Both the "premix" and "post-addition" methods require the use of water in order to add the calcium source to the juice stream. In order to meet the standard of identity, Not-from-concentrate (NFC) juice products, and in particular NFC orange juice products, can not contain added water. The juice strength, as it is extracted from the fruit, must be maintained. However, the direct addition of calcium sources, in particular calcium hydroxide, to NFC juice streams can cause a number of problems. These include degradation of the juice, and incomplete or inadequate solubilization of the calcium such that solid particles of the calcium source (e.g., calcium hydroxide) or calcium titrate wind up on the bottom of the blend tank. Since NFC orange juice products are desired by a number of orange juice consumers, it would be desirable to be able to develop a process for supplementing such products with calcium that avoids degradation of the juice and incomplete/inadequate solubilization of the calcium, without adding water.

DISCLOSURE OF THE INVENTION

The present invention relates to a method for preparing calcium-supplemented, ready-to-serve fruit juice beverages, in particular orange juice beverages, that can be made with not-from-concentrate (NFC) fruit juice streams. This method comprises the steps of:

(a) forming an acidified juice stream comprising (i) not-from-concentrate juice and (ii) an acidulant;

(b) passing said acidified juice stream of step (a) through a mixing zone that creates a turbulent flow in the acidified juice stream;

(c) adding a powdered source of calcium selected from the group consisting of calcium hydroxide, calcium carbonate, calcium lactate, calcium phosphate, calcium sulfate, and mixtures thereof, to said acidified juice stream in the mixing zone and recirculating the calcium-supplemented juice back to blend tank until said acidified juice stream comprises from about 0.05% to about 0.3% by weight solubilized calcium.

A. Definitions

As used herein, the term "fruit juice beverage" refers to a fruit juice product which is in a single-strength, ready-to-serve, drinkable form. Fruit juice beverages of the present invention are "full-strength" type which typically comprise at least about 95% fruit juice.

As used herein, the terms "concentrated fruit juice" or "fruit juice concentrate" refer to fruit juice from which a portion of the water has been removed.

As used herein, the terms "not-from-concentrate" or "NFC" refer to unfermented juice, from which no water has been removed, obtained from mature fruit. In particular "NFC orange juice" refers to oranges of the species Citrus sinensis, Citrus reticulate or of the citrus hybrid commonly called "Ambersweet". The terms "not-from-concentrate" or "NFC" also encompasses pasteurized orange juice prepared from unfermented juice as described for example in 21 CFR §146.35 and 21 CFR §146.140 herein incorporated by reference.

As used herein, the terms "pasteurize" and "pasteurization" refer to treatment processes where materials are heated, without radiation, to temperatures and for periods of time sufficient to at least partially sterilize the material against microbial, mold growth and yeast, without substantial alteration of the chemical composition of the material. Pasteurized materials are characterized by prolonged stability against spoilage by microbial and mold growth. The terms "pasteurize" and "pasteurization" include the more restrictive terms "sterilize" and "sterilization" where the treated material is substantially free of microbial and mold growth.

As used herein, the term "fruit juice stream" refers to a generally homogeneous mixture of fruit juice materials, including fruit juice aroma and flavor volatiles, peel oils, sensible pulp or pomace, plus other materials such as additional edible acids, sources of calcium, other minerals, vitamins, and the like.

As used herein, the term "fruit juice" refers to citrus juices, noncitrus juices such as apple juice, grape juice, pear juice, cherry juice, plum juice, prune juice, passion fruit juice, banana juice, and mixtures of these juices.

As used herein, the term "citrus juice" refers to fruit juices selected from orange juice, lemon juice, lime juice, grapefruit juice, tangerine juice and mixtures thereof.

As used herein, the term "comprising" means various components can be conjointly employed in the fruit juice beverages and fruit juice streams of the present invention. Accordingly, the term "comprising" encompasses the more restrictive terms "consisting essentially of" and "consisting of."

All amounts of fruit juice referred to herein are on a single-strength basis.

B. Fruit Juice Stream

An important component in preparing calcium-supplemented fruit juice beverages according to the present invention is the fruit juice stream. Much of the following discussion on fruit juice stream formulation will be directed at orange juice streams which are used to prepare highly preferred not-from-concentrate, calcium-supplemented orange juice according to the present invention. However, fruit juice streams based on other citrus juices such as grapefruit juice, noncitrus juices such as apple juice, as well as mixtures of juices, can also be formulated and pasteurized or sterilized according to this method.

The orange juice used in preparing the juice streams of the present invention can be obtained by standard orange juice processing. See Ting et al., *Citrus Fruits and their Products*, (Marcel Dekker, Inc. 1986) pp. 8–10 and Nagy et al., *Citrus Science and Technology*, Vol. 2, (AVI Publishing Co. 1977), pp. 177–252 (herein incorporated by reference) for standard processing of oranges, grapefruit and tangerines. See also Nelson et al., *Fruit & Vegetable Juice Processing Technology* (3rd Ed., AVI Publishing 1980), pp. 180–505 (herein incorporated by reference) for standard processing of noncitrus juices such as apple juice, grape juice, pineapple juice, etc. to provide source of juice and other juice materials for noncitrus juice streams.

C. Preparation of Not-From-Concentrate Juice Stream

A method for preparing a NFC juice stream consists of picking mature fruit from the orange groves. Fermented fruit must not be used. Mature fruit is usually determined by the soluble sugar solids in the juice, the ratio of soluble sugar solids to acid, juice content and color. The best quality orange juice is generally produced when the Brix-to-acid ratio is from about 12 to about 19. Preferably the Brix to acid ratio is from about 13 to about 16. Leaf, twigs and damaged fruit are removed. Before extraction, fruit are cleaned using a rotating brush washer or similar washers. A food-grade detergent or an acid wash is used to thoroughly remove dirt, scales, or other adhered material. The fruit is rinsed and graded. The fruit is then extracted using a mechanical extractor, for example a FMC-type citrus extractor Model No. 391. It is important herein that the juice extractor be of high quality and well-matched to the size of the fruit so as to avoid having excessive peel-oil contaminate the juice. Mechanically extracted juice contains pulp and sometimes seeds and peel pieces. A finisher or centrifuge is used to remove these particles from the juice stream. Another suitable method for removing these particles are described, for example in U.S. Pat. No. 5,073,397 to Tarr et al., issued Dec. 17, 1991. If the freshly extracted juice contains a large amount of air and/or peel oil, the juice may be deaerated. Deaeration of fruit juices are well known in the art and is described, for example in U.S. Pat. No. 5,006,354 to Rahrooh et al., issued Apr. 9, 1991.

D. Preparation of Acidified Juice Stream

In addition to juice materials, the juice stream often contains edible acids. Even though fruit juices often contain significant amounts of citric and/or malic acids, the amount of citric and malic acid actually present in juice is usually insufficient to adequately neutralize and solubilize the calcium which is subsequently added and to maintain the pH and sourness character desired in the resulting juice product. Accordingly, edible acids typically need to be added to the juice stream.

To prepare an acidified juice stream, dry citric and malic acid are blended with the Juice Stream (B) in a blend tank. The edible acid(s) are acidulants used to solubilize the added calcium, to help adjust the pH of the fruit juice to the desired level and to restore the taste and acidity of the juice to approximate its original level. Suitable equipment for dissolving the citric and malic acids in the juice stream include a blend tank with an agitator, a propeller mixer, or other mixers known in the art.

For fruit juice streams generally, this added acid typically comprises from about 5% to about 90% by weight citric acid and from about 10% to about 95% by weight malic acid, preferably the juice stream comprises from about 5% to about 60% by weight citric acid and from about 40% to about 95% by weight malic acid. (For noncitrus juice streams such as apple juice streams, this added acid typically comprises from about 5% to about 100% by weight citric acid and from 0 to about 95% by weight malic acid). Besides citric and malic acid, other edible acids can be used, as, for example, phosphoric acid, fumaric acid, adipic acid, lactic acid, tartaric acid, gluconic acid or mixtures thereof can be added in their undisassociated form or else as the respective sour salt, e.g. citrate, malate, phosphate, tartrate, gluconate and lactate.

The level of added edible acids, plus those naturally present in the fruit juice (hereafter total acids), depends on the fruit juice stream involved, the level of calcium to be added to the fruit juice stream, as well as the sourness and taste properties in the resulting fruit juice beverage. The total acid in the fruit juice stream comprises from about 30% to about 70% by weight citric acid and from about 30% to about 70% by weight malic acid, preferably the total acid in the fruit juice stream comprises from about 40% to about 60% by weight citric acid and from about 40% to about 60% by weight malic acid. Typically, the total acid level in the juice stream is sufficient to neutralize from about 100% to about 300% of the subsequently added calcium. Preferably, the total acid level in the juice stream is sufficient to neutralize from about 125% to about 250% and most preferably from about 150% to about 200% of the added calcium.

E. Adding Calcium to Acidified Juice Stream

An important component in preparing calcium supplemented fruit juice of the present invention is the addition of the dry calcium source. This source provides most, if not all, of the calcium supplementation for the fruit juice beverage. The calcium source primarily comprises calcium hydroxide. However, if desired, minor amounts of other calcium salts such as calcium carbonate, calcium oxide, calcium chloride, calcium citrate, calcium gluconate, calcium lactate, calcium phosphate, calcium sulfate and mixtures thereof can also be added.

After the acid addition, a recirculating flow loop of acidified juice from the blend tank to the mixer and back to the blend tank is established.

The powdered calcium source is homogeneously dispersed in the recirculating acidified fruit juice stream. As used herein, the term "homogeneously dispersed" refers to a method in which the calcium is completely and uniformly dispersed in the juice stream. Homogeneous dispersion minimizes localized areas of high pH, lumps and powder adhering to the walls of equipment. Suitable equipment for adding calcium consists of a mixer that prevents the powder from coming in contact with the walls of the equipment and provides a continuous liquid flow of the acidified juice stream. It is important that the rate of addition of the dry calcium source to the acidified juice stream is controlled and that the mixer contains a highly turbulent mixing region where the acidified juice stream meets the dry calcium powder such that the powder is solvated and dispersed rapidly. In-line mixers, static mixers, or mixers that use normal agitation are not preferred. Equipment suitable for introducing and uniformly mixing the calcium powder into the juice stream include a Tri-Clover Triblender Model F2116 MDS, or an equivalent system in which the dry calcium powder is aspirated directly into the highly turbulent mixing region. Alternatively a high shear mixing device equipped with an inductor funnel may also be used. An example of such mixing devices are made by Albion Engineering Company, Models 128-GO2, 296-GO1 and 296-GO2. See for example Albion mixing Devices Bulletin No. 215. Another suitable method for addition of the dry calcium powder is described for example in U.S. Pat. No. 4,089,050 to Huet issued May 9, 1978.

The calcium source is added in an amount appropriate to provide the desired calcium-supplemented fruit juice. The flow rate of the juice stream and the addition rate of the calcium powder typically acts as a fine control for determining the quality of the resulting calcium supplemented fruit juice. The rate of calcium addition depends on a number of factors, including the amount of calcium to be added, the flow rate of the juice stream, the turbulence provided by the mixer, and like factors.

The amount of calcium added to the juice stream depends on the level of calcium desired in the final product. Typically from about 0.05% to about 0.3% by weight, preferably from about 0.1% to about 0.26%, and more preferably from about 0.12% to about 0.20% by weight calcium can be added to the acidified juice stream. Typically, the rate of calcium addition to the juice stream is from about 4 lbs/min. to about 60 lbs/min, preferably from about 6 lbs/min. to about 30 lbs/min. and more preferably from about 10 lbs/min. to about 20 lbs/min.

It is important in the present invention that the mixing device circulates the fruit juice and provides turbulence. It is also important that the calcium supplemented juice stream be promptly returned to or recirculated through the blend tank containing the remainder of the acidified juice.

Failure to promptly return the calcium-supplement to the blend tank may cause degradation of the juice product (i.e. off flavors, unacceptable aroma, and color changes).

Typically, the juice stream is circulated at a rate of from about 60 lbs/min. (27.2 kg/min.) to about 390 lbs/min. (177 kg/min.), preferably from about 100 lbs/min. (45.3 kg/min.) to about 325 lbs/min. (174.4 kg/min.), preferably at a rate of from about 150 lbs/min. (68 kg/min.) to about 250 lbs/min. (113 kg/min.), and more preferably at a rate of from about 175 lbs/min. (79 kg/min.) to about 220 lbs/min. (99.8 kg/min.).

It is readily apparent that modifications can be made in the rates hereinabove described without thereby departing either from the scope or the spirit of the invention. Controlling of conditions such as either rates or flow of liquid, acidulants and powder addition are within the skill of one in the art.

Once the calcium is added the fruit juice is recirculated for a time sufficient to ensure thorough mixing. The length of time for recirculating the juice after the calcium addition depends on the amount of juice prepared and the amount of calcium added. Typically a circulation time of from about 2 min. to about 5 min. is sufficient for preparing at least 500 gallons (1,8931) of NFC juice supplemented with from about 0.05% to about 0.3% by weight calcium.

The juice stream and calcium source also need to be combined so as to control the maximum pH of the resulting calcium-supplemented fruit juice beverage. If the pH is too high a level, microbial and mold growth can be encouraged, as well as the undesirable degradation of components, such as pectins in the juice stream. Accordingly, the pH of the resulting calcium-supplemented fruit juice beverage should be no higher than about 4.5. Preferably, the pH of the resulting fruit juice beverage is no higher than about 4.0. The pH of the resulting fruit juice beverage can usually be controlled by rate of calcium addition, the level of calcium added, the total acid level in the juice stream, or combinations thereof.

The fruit juice beverages obtained after combining the juice stream and powdered calcium have from about 0.05% to about 0.30% by weight solubilized calcium, i.e. calcium ion which has been dissolved. Preferably, the fruit juice beverages obtained by the method of the present invention have from about 0.13 to about 0.26, and more preferably from about 0.14% to about 0.2% solubilized calcium. The preferred fruit juice beverages comprise about 0.134% solubilized calcium.

The calcium-supplemented NFC fruit juice obtained typically have a solids content of from about 10.5° to about 14° and preferably from about 11° to about 13° Brix. The solids content of such beverages depends on the Brix of the starting fruit juice in the juice stream, and the amount of edible acids and calcium added.

After the calcium-supplemented fruit juices are obtained, they are then subjected to a pasteurization or a sterilization step. The fruit juice can be pasteurized by passage of the calcium supplemented juice stream through high temperature processing equipment. High temperature processing typically refers to processing at temperatures of from about 180° F. to about 212° F. (82.2° C. to about 100° C.). Pasteurization of fruit juice streams by high temperature processing can be carded out through the use of indirect heat exchangers. Indirect heat exchangers can be either of the shell and tube type, or, more typically, of the plate and frame type. Methods for sterilization or pasteurization are well known in the art, see for example Nagy et al., *Citrus Science and Technology*, Vol 2 (AVI Publishing Co. 1977) pp. 201–202.

Once pasteurized or sterilized, the fruit juice can be poured into cartons, bottles or other suitable containers. Since most of these packaged fruit juice beverages are chilled, they are preferably refrigerated.

SPECIFIC ILLUSTRATIONS OF THE METHODS FOR PREPARING CALCIUM SUPPLEMENTED FRUIT JUICE

The following examples are given to illustrate the invention and are not intended to limit it in any way.

EMBODIMENT 1

A NFC orange juice is formulated in a 500 gallon (1,890 liter) tank by combining the following ingredients:

| Ingredients | Wt. % |
| --- | --- |
| NFC Orange juice | 99.4 |
| Citric Acid | 0.02 |
| Malic Acid | 0.35 |
| Calcium Hydroxide | 0.23 |
| Total | 100.00 |

Citric and malic acids are added to NFC orange juice. The acidified juice stream is pumped from the bottom of the blend tank, through the Tri-Blender and back through the top of the tank, using a Triblender feed pump. The circulation rate of the juice stream is about 178 lbs/min. (80 kg/min.). The calcium hydroxide is put into a closed funnel located on the Tri-blender. The funnel is opened and the calcium is added at a rate of about 60 lbs/min. (27.2 kg/min.). The calcium containing juice is recirculated back to the blend tank for about an additional 2 min., while it is continuously mixed with the balance of the acidified juice.

The calcium supplemented juice has a solids content of about 13.1 Brix, a % acid (measured as % citric acid) of about 0.83, 0.126% calcium and a pH of less than about 4. The juice is then sterilized by passage through a plate and frame heat exchanger at a temperature of 180° F. (82.20° C.) and a flow rate of 6.1 liters per minute (1 pm). The residence time is on the order of 20 to 30 seconds. The sterilized juice is then chilled to about 40° F. (4.40° C.) and packaged.

EMBODIMENT 2

A NFC orange juice is formulated in a 500 gallon (1,890 liter) tank by combining the following ingredients:

| Ingredients | Wt. % |
| --- | --- |
| NFC Orange juice | 99.70 |
| Citric Acid | 0.01 |
| Malic Acid | 0.18 |
| Calcium Hydroxide | 0.11 |
| Total | 100.00 |

Citric and malic acids are added to NFC orange juice. The acidified juice stream is pumped from the bottom of the blend tank, through the Tri-Blender and back through the top of the tank, using a triblender feed pump. The circulation rate of the juice stream is about 185 lbs/min. (84 kg/min.). The calcium hydroxide is put into a closed funnel located on the Tri-blender. The funnel is opened and the calcium is added at a rate of about 35 lbs/min. (15.8 kg/min.). The calcium containing juice is circulated for about an additional 2 min., while it is continuously mixed with the acidified juice in the blend tank.

The juice is then sterilized by passage through a plate and frame heat exchanger at a temperature of 180° F. (82.2° C.) and a flow rate of 6.1 liters per minute (1 pm). The residence time is on the order of 20 to 30 seconds. The sterilized juice is then chilled to about 40° F. (4.4° C.) and packaged. The calcium supplemented juice has a solids content of about 13.0 Brix, a % acid (measured as citric acid) of about 0.8, 0.63% calcium and a pH of less than about 4.

EMBODIMENT 3

A NFC apple juice is formulated in a 500 gallon (1,890 liter) tank by combining the following ingredients as in Embodiment 1:

| Ingredients | Wt. % |
|---|---|
| NFC Apple juice | 99.50 |
| Citric Acid | 0.07 |
| Malic Acid | 0.20 |
| Calcium Hydroxide | 0.23 |
| | 100.00 |

The calcium supplemented juice has a solids content of about 13.0 Brix, a % acid (measured as % citric acid) of about 0.8, 0.12% calcium and a pH of less than about 4.

A NFC orange juice is formulated by combining the following ingredients:

| Ingredients | Wt. % |
|---|---|
| NFC Orange juice | 98.35 |
| Citric Acid | 0.02 |
| Malic Acid | 0.35 |
| Calcium Hydroxide | 0.23 |
| Pulp | 1.05 |
| | 100.00 |

Citric and malic acids are added to the NFC juice (900 gallons, 3,407 liters) in the blend tank. The juice is then recirculated from the blend tank to mixer and back to the blend tank. Calcium hydroxide is added to the recirculating acidified juice through a funnel located on a triblender. The circulation rate of the juice stream is about 390 lbs/min. (176.9 kg/min.) and the calcium is added at a rate of about 37 lbs/min. (16.7 kg/min.). The calcium supplemented juice is recirculated for about 4 min. The juice is then sterilized by passage through a plate and frame heat exchanger at a temperature of 180° F. (82.2° C.) and a flow rate of 50 gal./minute or liters per minute (1 pm). The residence time is on the order of 20 to 30 seconds. The sterilized juice is then chilled to about 40° F. (4.4° C.) and packaged.

The calcium supplemented juice has a solids content of about 12.4 Brix, a % acid (measured as % citric acid) of about 0.59, 0.129% calcium and a pH of less than about 4.

What is claimed is:

1. A method for preparing a not-from concentrate calcium-supplemented fruit juice which comprises the steps of:
   (a) forming an acidified juice stream comprising (i) not-from-concentrate juice and (ii) added edible acid;
   (b) passing said acidified juice stream of step (a) through a mixing zone that creates a turbulent flow in said acidified juice stream;
   (c) adding a powdered source of calcium selected from the group consisting of calcium hydroxide, calcium carbonate, calcium lactate, calcium phosphate, calcium sulfate, and mixtures thereof, to said acidified juice stream in the mixing zone until said acidified juice stream comprises from about 0.05% to about 0.3% by weight solubilized calcium, the total acid level in said acidified juice stream being sufficient to neutralize from about 100% to about 300% of said added calcium.

2. A method according to claim 1 wherein said added edible acid comprises citric acid, malic acid or mixtures thereof.

3. A method according to claim 2 wherein said powdered calcium is selected from the group consisting of calcium hydroxide, calcium carbonate and mixtures thereof.

4. A method according to claim 3 wherein said calcium source comprises from about 0.06% to about 0.13% of said acidified juice stream.

5. A method according to claim 4 wherein said juice is a citrus juice selected from the group consisting of grapefruit, tangerine, lime, lemon and mixtures thereof.

6. A method according to claim 4 wherein said juice is apple juice.

7. A method according to claim 3 wherein said calcium source comprises from about 0.14% to about 0.26% of said acidified juice stream.

8. A method according to claim 1 wherein said not-from-concentrate juice is orange juice.

9. A method according to claim 1 comprising the additional step of sterilizing or pasteurizing said acidified juice stream after step (c).

10. A method according to claim 9 wherein said acidified juice stream is sterilized using high temperature short time sterilization.

* * * * *